Dec. 14, 1965  D. BISHOP ETAL  3,222,789
LINEAR MEASURING INSTRUMENTS
Filed April 20, 1961  4 Sheets-Sheet 1
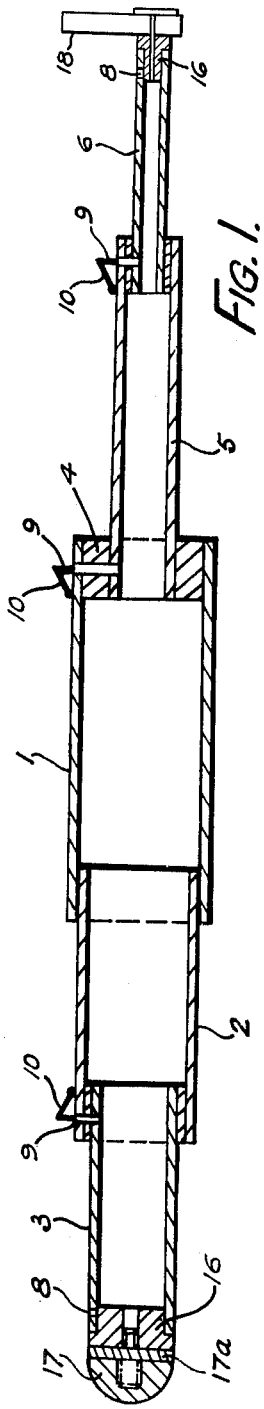
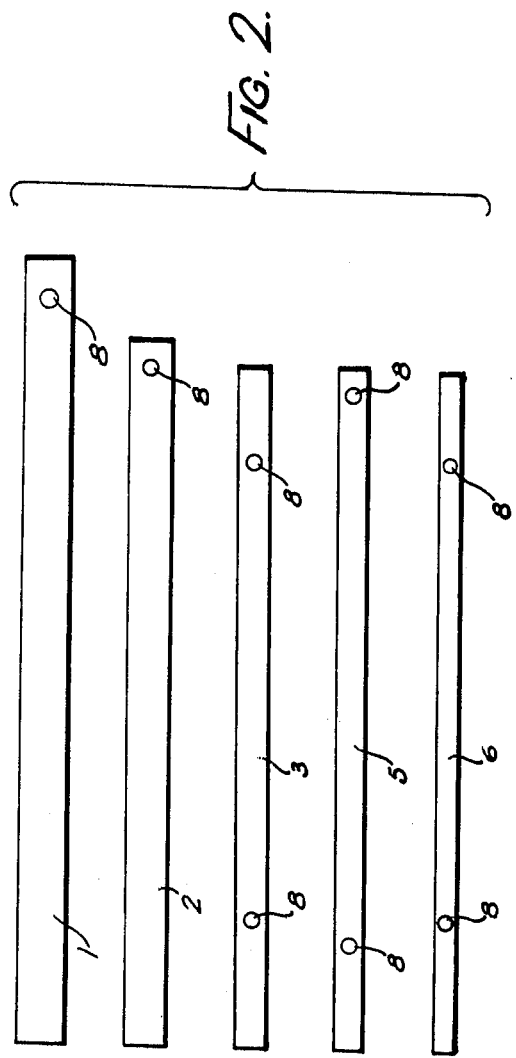
INVENTORS
DONALD BISHOP
JONATHAN HEATH RIPPER
BY Lawson and Taylor

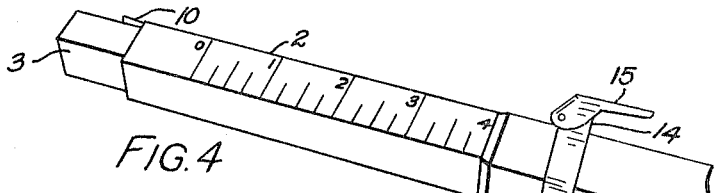
FIG. 4
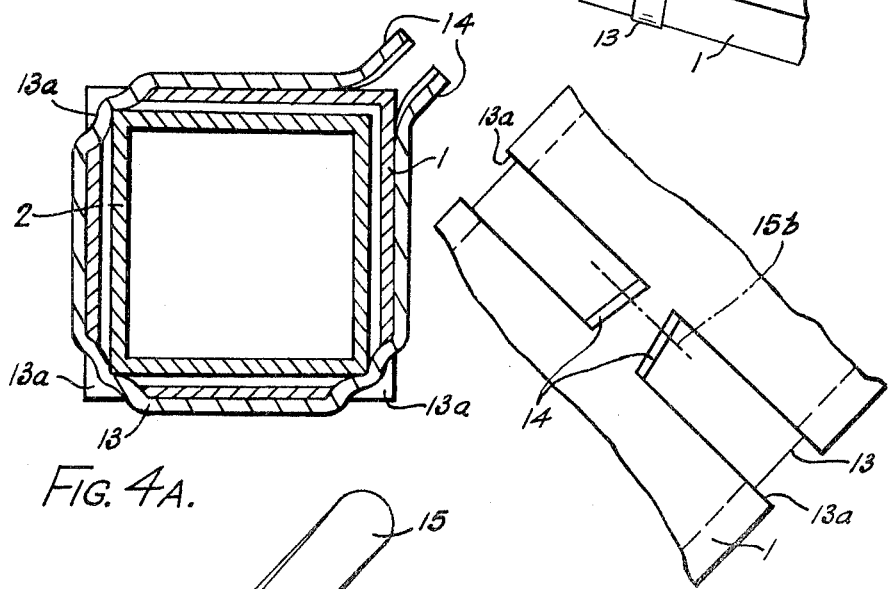
FIG. 4A.
FIG. 4B.
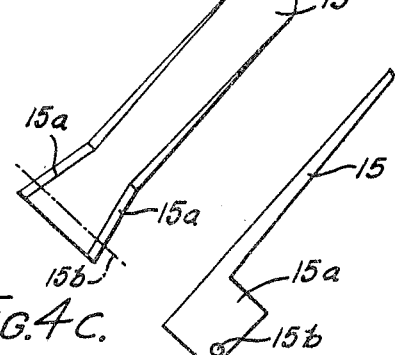
FIG. 4C.
FIG. 4D.
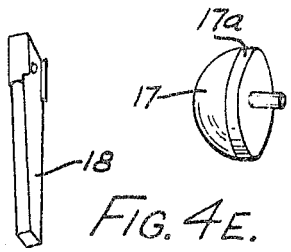
FIG. 4E.
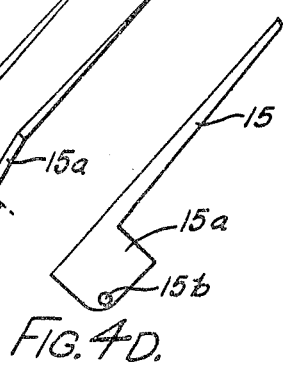
FIG. 3B.
INVENTORS
DONALD BISHOP
JONATHAN HEATH RIPPER
BY
Larson and Taylor

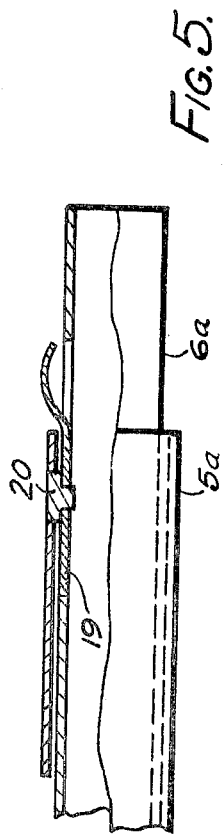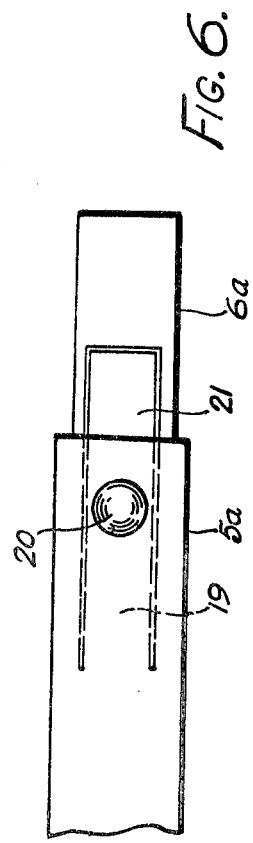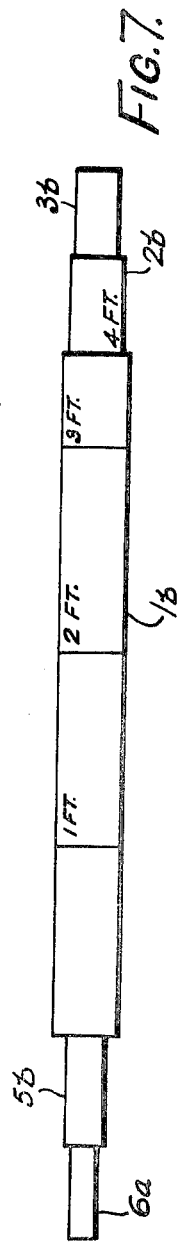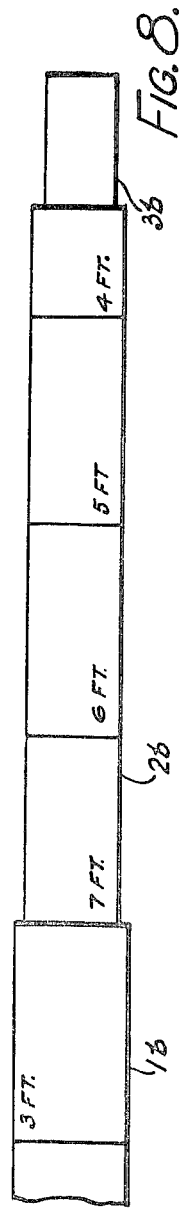

United States Patent Office
3,222,789
Patented Dec. 14, 1965

3,222,789
LINEAR MEASURING INSTRUMENTS
Donald Bishop, St. Albans, and Jonathan Heath Ripper, Barnhurst, England, assignors to National Research Development Corporation, London, England, a British corporation
Filed Apr. 20, 1961, Ser. No. 104,315
Claims priority, application Great Britain, June 16, 1960, 21,270/60
5 Claims. (Cl. 33—161)

This invention relates to linear measuring instruments of the kind normally used for measuring or setting out internal or overall dimensions in buildings or like structures. It has for an object to provide an instrument which is both versatile in its application and simple in use.

During or after the construction of buildings it is important to check the internal dimensions of window or door openings, rooms, etc. This is frequently most conviently achieved by the use of a rigid measuring rod or bar which can be carried in the hand and offered into the opening concerned. It is a frequent practice where a number of openings of the same dimensions are to be checked to select a length of, say, timber on the site and cut it to the required length. Where, however, the dimensions are large, such a simple device is both cumbersome and inaccurate. Furthermore, it will be evident that it is impossible by this means to check the amount of any deviation from the required dimension with any reasonable accuracy.

The present invention provides an adjustable tubular measuring instrument comprising a tubular holder into which are slidably fitted at opposite ends thereof a pair of telescopically extensible tubes of predetermined length, one of said tubes being of an external peripheral dimension sufficient to enable it to enter the other telescopic extensible tube, means being provided for determining the degree of telescopic extension.

A measuring instrument constructed in the foregoing manner has at least two major advantages. In the first place the facility for telescopic extension simultaneously in opposite directions results in a mechanically balanced tool which can easily be carried by one person who is enabled to hold it at approximately its centre of gravity whereby control of the alignment of the instrument is markedly facilitated.

Secondly, the instrument can be graduated at a point near its mid-point by the engraving of a scale on one of the telescopic members so that the exact dimensions being checked can be read by the operator.

Practical embodiments of the present invention are illustrated, by way of example, in the accompanying drawings in which:

FIGURE 1 is a schematic longitudinal section showing an adjustable tubular measuring instrument in its fully extended condition;

FIGURE 2 shows diagramatically separate tube components of the instrument of FIGURE 1 in elevation;

FIGURE 3A is a perspective view of a detail;

FIGURE 4 is a perspective view of one end of the instrument partly extended;

Figure 3:
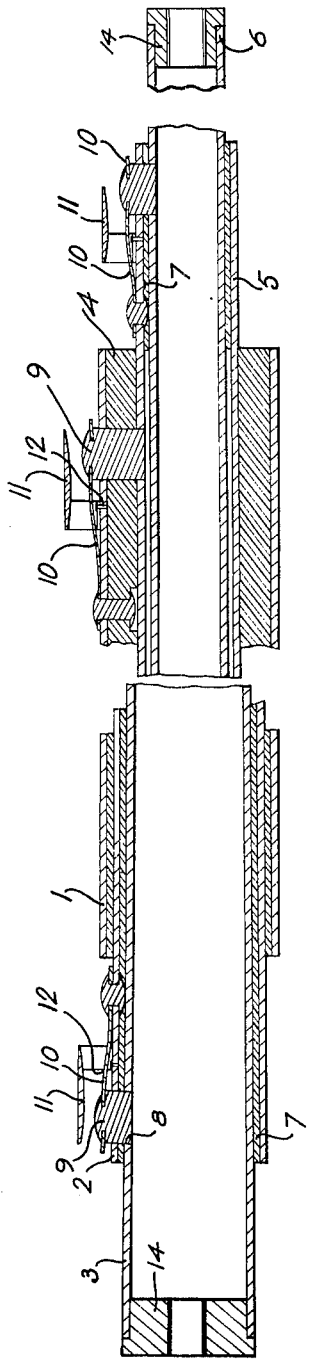
FIGURE 3 is a more detailed sectional view of part of the instrument of FIGURE 1.

FIGURES 4A, 4B, 4C, and 4D show details of a spring clamp for the instrument;

FIGURE 4E shows two attachments;

FIGURE 5 is a part-sectional view of part of a modified construction;

FIGURE 6 is an elevation of the construction of FIGURE 5;

FIGURE 7 is a schematic elevation of a further modification, and

FIGURE 8 is an enlarged view of one end of the instrument of FIGURE 7 partly extended.

The figures are not drawn to scale.

Referring first to FIGURE 1 of the drawings, the extensible rule consists of a main holder tube 1 of square or rectangular section and of a length slightly in excess of the maximum increment of length to be measured by each telescopic extension. Through one end of the holder tube 1 slides a first telescopic extension tube 2 one of whose surfaces preferably carries graduations of length to be read against the end of the holder tube 1. Within the first extension tube 2 slides a similar tube 3. This need not be graduated.

The opposite end of the holder tube 1 is partially closed by a bearing bush 4 of a suitable anti-friction material such as PTFE (polytetrafluoroethylene), the internal dimensions of which are less than the internal dimnsions of the second extension tube 3. Within the bush 4 slides a third extension tube 5 whose external dimensions are such that it can be telescoped into the second extension tube 3. Within the tube 5 slides a fourth extension tube 6.

When the rule is to be collapsed after extension, the first and second extension tubes 2, 3 are first pushed back into the holder tube 1. The inner end of the tube 3 may butt against the inner end of the bushing 4, and its bore is in alignment with the bore through the bushing. The tube 5 can then be slid back into the tube 3 so that both oppositely extended sets of tubes 2, 3 and 5, 6 thus nest one within the other inside the holder tube 1. Each tube is preferably lined at its outer end with a thin layer 7 of low-friction material such as PTFE (see FIGURE 3. This improves the smoothness of the sliding action of the tubes and serves to prevent undue side play and misalignment. Furthermore, each of the telescopic tubes 3, 5 and 6 is provided with means for locking it at its maximum predetermined extension, and this locking means preferably consists of a hole 8 (FIGURE 2) adjacent one end of the tube and a button 9 (FIGURE 3) which is secured to a leaf spring 10 riveted to the adjacent outer tube, the button similarly passing through a clearance hole to register with the hole 8. To collapse the tubes, each button 9 is withdrawn by lifting this leaf spring 10 by means of a trigger 11 (FIGURE 3A) which pivots about its leading bottom edge 12.

In order to keep the rule in any desired intermediate position of its extension, the holder tube 1 has a releasable spring clamp 13 (FIGURE 4) encircling the tube and having a pair of lugs 14 to which is hinged a channel-shaped lever 15 having converging sides which, when forced over the lugs, draw the band tighter to lock the first (and normally graduated) slide 2 in an intermediate position. The spring clamp arrangement is shown in greater detail in FIGURES 4A, 4B, 4C and 4D. Figures 4A and 4B respectively show a cross-sectional view through the clamp and an elevation of the clamp in position, the lever 15 being omitted from those figures for clarity of illustration and shown separately in FIGURES 4C and 4D. As can be seen, the tube 1 is cut away or slotted at three corners at 13a so that the spring clamp 13 can normally lightly engage the slide 2 at these points. The lugs 14 converge so that co-action with the converging sides 15a of the channel-shaped lever 15, which is pivoted to the lugs on an axis 15b, moves the lugs towards each other when the lever 15 is pushed towards the tube 1. Thus the spring clamp 13 grips the slide 2 tightly through the slots in the tube 1. Reverse movement of the lever 15 loosens the clamp 13 so that the slide 2 can be easily moved.

The outer ends of the innermost tubes 3, 6 of each telescopic set are closed by plugs 16, 16a which are used as measuring anvils for taking measurements between plane surfaces, but are threaded to receive anvil attachments when making either external measurements or internal measurements into angles between walls or the like. The internal measurement attachment is a hemisphere 17 (FIGURE 4E) of any convenient, substantially wear resistant material, and the external measurement attachment is a caliper finger 18 (FIGURE 4E), either attachment being screwed into place as required.

The hemispherical attachments 17 are intended for use when measurements are to be taken to internal angles bounded by planes. Often, in these cases the actual corner is irregular or ill-defined, and measurements are best taken to a notional corner defined by the intersection of the planes bounding it. Thus, when the attachment is fitted, the dimension indicated by the scale on the tube 2 is short of the actual dimension by $2\sqrt{2}.r$ ($r$ being the radius of the sphere) when the angles are bounded by two planes or by $2\sqrt{3}.r$ when the angles are bounded by three planes. In practice, packing pieces (17a) are inserted when measurements are taken to angles bounded by two planes so that the same correction can be added in both cases.

FIGURE 5 illustrates a modified construction of locking means between a tube 6a slidable into a tube 5a in an instrument of the kind shown, for example, in FIGURE 1. For clarity, the PTFE lining is not shown. One wall of the tube 6a is slit to provide a tongue 19 which carries a steel pin 20. The steel pin 20 is held by the spring action of the tongue 19 in a hole in the outer tube 5a, thus locking the two tubes against relative movement. The pin 20 can be removed from the hole in the tube 5a, so that the tubes can be telescoped, by depressing a bowed end 21 of the tongue 19, which bowed end projects above the sides of the two tubes.

FIGURE 7 shows an instrument of the kind hereinbefore described comprising tubes 1b, 2b, 3b, 5b and 6b in the closed position. The overall length of the closed instrument is 4 feet. The outer tube 1b is just over 3 feet long and is graduated in feet and inches. The next inner tube 2b is also graduated in feet and inches in such a way that the increased overall length of the instrument caused by the extension of the tube 2b from the tube 2a can be read on the tube 2b at the position where it enters the tube 1b, the end of the tube 1b acting as a cursor line. FIGURE 8 shows the tube 2b extended to give an overall instrument length of 7 feet. If one or more of the tubes 3b, 5b, 6b should also be extended, then an appropriate addition must be made to the reading.

We claim:

1. An adjustable measuring instrument comprising a tubular holder, at least one tubular extension member telescopically mounted in and extendable from a first end of the tubular holder, at least one tubular extension member telescopically mounted in and extendable from a second, opposite, end of said tubular holder, each of the tubular extension members extendable from one end of the tubular holder being moveable into the smallest of the tubular extension members extendable from the other side of the tubular holder whereby the measuring instrument is collapsible to a length at least comparable to the length of said tubular holder, clamp means on the tubular holder and adjacent a first end thereof with the tubular extension member extendable from that end and next adjacent the inner wall of said tubular holder to hold said tubular extension member at any position along its length with respect to said holder whereby said extension member is fully adjustable, locking means on the tubular holder and adjacent the second, opposite, end thereof to lock the tubular extension member extendable from that end and next adjacent the inner of said tubular holder to lock said extension member in a fully extended position whereby said extension member is non-adjustable, and a graduated scale provided on said fully adjustable extension member.

2. An adjustable measuring instrument according to claim 1 wherein the first end of said tubular holder includes an index registrable with said graduated scale whereby the combined extended length of the tubular holder and extension member bearing said scale is indicated at said index.

3. An adjustable measuring instrument according to claim 1 wherein at least one further extension member is slidably mounted in each of said tubular extension members and locking means is provided on each extension member for holding each further extension member at a fully extended position, which locking means comprises a spring-loaded detent on one extension member engageable in a hole in the associated extension member.

4. An adjustable measuring instrument according to claim 3 wherein a leaf spring is provided carrying each detent member and a pivotally mounted trigger member is provided which is movable to disengage the detent member from its associated hole.

5. An adjustable measuring instrument according to claim 3 wherein a spring carries each detent member, said spring comprising a tongue formed in the wall of an extension member, an end portion of the tongue being bent away from the extension member so that it can be manually depressed to disengage the detent member.

References Cited by the Examiner

UNITED STATES PATENTS

| | | | |
|---|---|---|---|
| 1,050,733 | 1/1913 | Greathead | 33—161 |
| 1,161,765 | 11/1915 | Dunbar | 33—143 |
| 1,614,139 | 1/1927 | McGowen | 33—161 |
| 2,088,394 | 7/1937 | Wright | 33—74 |
| 2,232,824 | 2/1941 | Maher | 33—161 |
| 2,518,128 | 8/1950 | Dufilho | 33—161 |
| 2,583,205 | 1/1952 | Boisen | 33—161 |
| 2,603,877 | 7/1952 | Gentz | 33—161 |
| 2,622,949 | 12/1952 | Cotchett | 308 |
| 2,675,256 | 4/1954 | Cornell | 287—58 |
| 2,937,765 | 5/1960 | Shank | 308 |

FOREIGN PATENTS 520,842  3/1955  Italy.

ISAAC LISANN, *Primary Examiner.*